Aug. 12, 1952   W. M. BAUMHECKEL   2,606,537
APPARATUS FOR SUPPLEMENTAL SELECTIVE FEEDING OF WATER
AND ALCOHOL IN AN ENGINE FUEL FEED DEVICE
Filed July 8, 1950   4 Sheets-Sheet 3

INVENTOR,
WILLIAM M. BAUMHECKEL,
By Herbert A. Minturn,
ATTORNEY.

Patented Aug. 12, 1952

2,606,537

UNITED STATES PATENT OFFICE 2,606,537

APPARATUS FOR SUPPLEMENTAL SELECTIVE FEEDING OF WATER AND ALCOHOL IN AN ENGINE FUEL FEED DEVICE

William M. Baumheckel, Indianapolis, Ind.

Application July 8, 1950, Serial No. 172,648

11 Claims. (Cl. 123—25)

This invention relates to means permitting the use of low octane number gasoline in the present type of automobile and automotive engines in general to allow them to perform smoothly, particularly in such constructions that normally would require a high octane number gasoline.

The structure involves essentially a device for supplying water or water vapor to the fuel intake flow in such manner that the water can enter the engine only when the engine has reached a predetermined operating condition such as being warmed for normal operation. That is no water may enter the engine while it is cold, such as at the initial starting of the engine. Further the structure involves the use of the water for control of detonation and pre-ignition at most compression pressures, and then and only then when the compression pressure is increased the structure provides the admittance of alcohol into the fuel flow entering the engine.

The structure maintains the water and alcohol separate one from the other, so that each may be introduced into the engine intake only as they may be individually required. In so doing, but very little alcohol is employed. It is employed only on full open throttle conditions of full power or load on the engine.

While the introduction of the water for certain compression pressures is of great advantage, still there are limitations, and these limitations generally enter in when the water reaches as much as 15% of the actual fuel employed. From that condition and on up at higher compression pressures, the alcohol is introduced to increase in effect the octane number reading so that high compression engines may be operated with low octane number fuels and also the higher compressions on full loads may be held without detonation or pre-ignition. Normally when alcohol is added to increase the octane number rating, the low octane number fuel such as gasoline, is decreased so that the resultant fuel will not be too rich in proportion to the air introduced.

The structure embodying the invention may assume different forms, such for example as one form which may be applied to carburetors now already installed on engines, and in another form, the structure may be built into a special carburetor where all of the various features are incorporated in one unit.

It is well known that if the compression ratio in an engine cylinder may be increased to a higher ratio such as from a normal present ratio of 6.5 to 1 for regular or 70 number octane gasoline, to 7 to 1 for so-called premium or 80 number octane fuel, and even on up to a 9 to 1 ratio for the one hundred octane number gasoline, the output in horsepower of that engine may be increased correspondingly and also the fuel consumption will be decreased. However the difficulties come in obtaining the higher octane number gasolines at the present time, particularly.

For the use of my invention, the low octane number gasolines may be employed even with the high compression ratios as just indicated.

As above indicated, the invention involves the use of certain control means whereby neither water or alcohol may be supplied to the engine when it is not in a condition to receive it, and also the water and alcohol are separately controlled to be responsive to the actual conditions requiring the introduction of either water or alcohol or both. This involves means in the structure responsive to pressures in the intake manifold or intake duct of the engine; means responsive to pressures in the engine itself such as the detonating pressure or a pressure closely approaching the detonating pressure; and the temperature of the engine or of exhaust gases or parts of the engine reflecting internal temperatures of the engine.

A still further important advantage of the invention resides in the fact that it offers a good means for cooling air cooled engines. This of course is done through the use of water by evaporating the water within the engine cylinder, and at the same time preventing the introduction of water into that cylinder until the cylinder is in a condition to require cooling.

Quite a saving in cost of operating an engine, such as for example in a truck carrying heavy loads, is to be found.

As an example of the saving, a certain truck operates with an engine having a compression ratio of 6 to 1. It uses 60 to 70 octane number gasoline costing around twenty cents per gallon, and will consume one hundred gallons of the gasoline for each five hundred miles of operation, or at a cost of four cents per mile for fuel alone. Now by employing my invention, the compression ratio is changed to 9 to 1, and the fuel is changed to a fifty octane number instead of seventy, and the price for the lower number gasoline is seventeen cents a gallon. The alcohol used is purchased at the rate of fifty cents per gallon. Now in going the five hundred miles, using one hundred gallons of the lower number gasoline, the cost for gasoline would be seventeen dollars, and two gallons of alcohol would be normally employed adding to the seventeen dollars the cost of one dollar making a total cost of eighteen dollars. However the same truck will make six miles per gallon or a total of six hundred miles on one hundred gallons of the fuel making the resultant cost of three cents per mile for fuel. Then if this same truck is driven three hundred miles per day at a saving of one cent per mile, the daily saving would be three dollars, and if operated for two hundred days per year, the saving would be six hundred dollars. This example is taken from actual operating conditions.

These and many other objects and advantages of the invention will become apparent to those versed in the art in the following description of two forms of structures now best known to me, and as illustrated more or less diagrammatically in the accompanying drawings, in which.

In the present showing of the invention, I illustrate the invention as applied to a downdraft carburetor generally designated by the numeral 10. This carburetor 10 has the air horn 11 entering from the top, and then carries around its side a fuel or gasoline bowl 12; a water bowl 13; and an alcohol bowl 14. Preferably these three bowls are formed as an integral part of the carburetor 10, and then the carburetor 10 as a whole is mounted in the usual manner by the flange 15 on the top of the intake manifold heater chamber 16, this chamber being around the intake manifold 17, and a part thereof. The exhaust heat member 16 is of standard construction, and obtains its heat from the exhaust pipe 18 all in the usual and well known manner, and has a thermostatic control (not shown) for supplying that heat initially, and then eliminating the flow of exhaust gases through the chamber after the engine has become sufficiently heated.

The gasoline bowl 12 has a fuel pipe 19 connecting therewith. The water bowl 13 has a supply pipe 20 connecting therewith, and the alcohol bowl 14 has a supply pipe 21 connected therewith. It is to be understood of course that these pipes 19, 20, and 21 lead from respective storage tanks which are not shown since they do not constitute the part of the invention per se. In this regard, it is pertinent to note that the water coming through the pipe 20 may be permitted to freeze in extremely cold weather if that occasion arises without any damage to the device since the pipe 20 may be made out of flexible material, and the other parts of the mechanism may be so designed as to permit expansion under iced conditions if that be necessary. In any event, the ice will be melted by the time that water is required, the heating temperature being supplied from the operation of the engine in the normal manner after it once starts.

Figure 6:
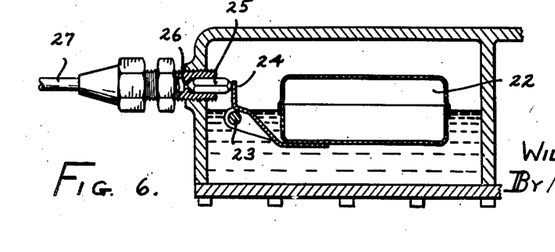
Fig. 6 is a view in vertical section indicating a float control device applicable to either the gasoline, the water, or the alcohol supply bowls.

A typical control of the three liquids, namely the gasoline, the water, and the alcohol, is shown in Fig. 6 wherein there is a float 22 hinged on a pin 23 to have an upwardly turned lever arm 24 in the path of a valve member 25 which will slide against a seat 26 when the float 22 is rocked upwardly to a predetermined level. The fluid enters through the pipe 27 in that particular showing. That is standard construction, and is employed in the several bowls 12, 13 and 14.

Gasoline from the bowl 12 is supplied to the air flow through the horn 11 in any one of the usual and well known manners, and hence is not herein shown with the exception that the fuel will be supplied in part through the jet orifice 28 which opens into the primary venturi 29. The fuel from the main nozzle having the orifice 28 is atomized in this primary venturi 29 to be carried down by the velocity of the air through the secondary venturi 30, and on through the main venturi 31.

Figures 4, 5:
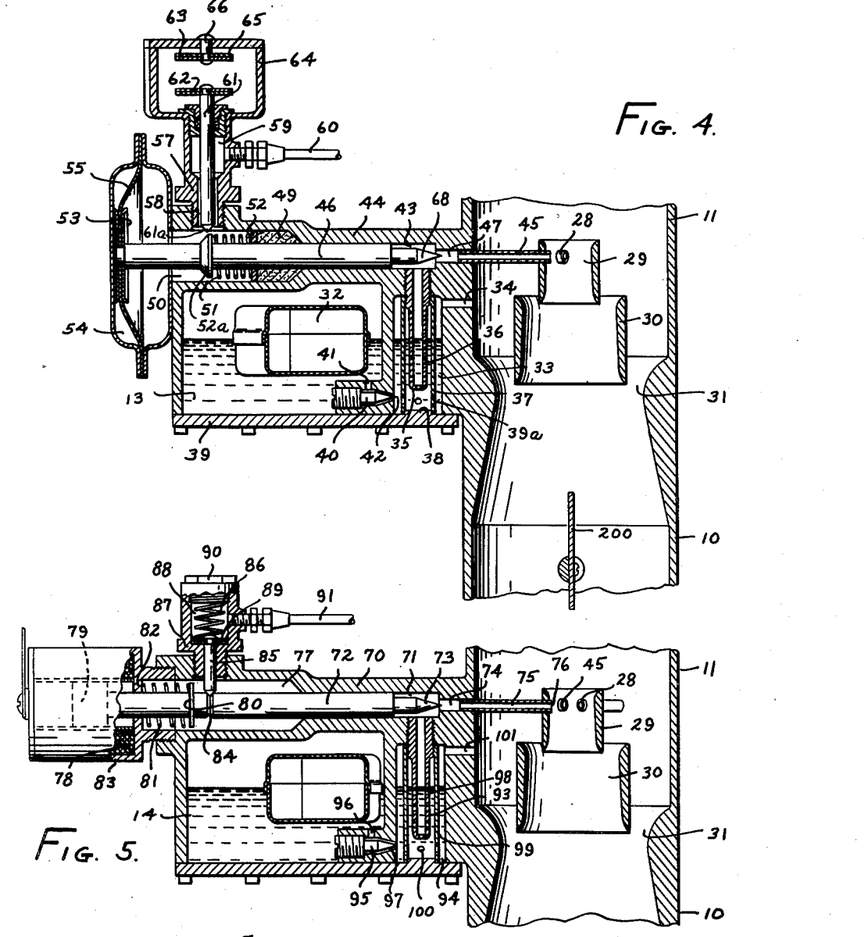
Fig. 4 is a detail in vertical section on the line 4—4 in Fig. 2.
Fig. 5 is a view in vertical section on the line 5—5 in Fig. 2.

Referring to Fig. 4, which illustrates a vertical section through the water supply bowl and the mechanism on top thereof, the bowl 13 has therein the level control float 32 which operates in the manner described in reference to Fig. 6. The bowl 13 is provided with a well 33 at one side, and this well has a passageway 34 opening from its top end into the air horn 11 at an elevation above the main venturi 31. An atomizing tube 35 is centrally disposed within the well 33 to extend therein from its upper end, and this tube carries a plurality of openings 36 around its lower portion so as to provide the communication of the water from the well 33 to the inside of the tube 35.

Surrounding the tube 35 in spaced relation is a sleeve 37 which is fixed by its top end against the top end of the well 33 and against the floor of the well 33, herein shown as being centered on a boss 38 on the lower cover plate 39. This sleeve 37 has a plurality of holes 39a from around its lowermost portion to permit water to enter into that sleeve therethrough and fill the space up to the permissible level between the tube 35 and the inside of the sleeve 37. The normal level of the water within the well 33 is that within the bowl 13 as controlled by the float 32. A metering needle 40 is provided, herein shown in a more or less diagrammatic arrangement to control the rate of flow of water from the bowl 13 into the well 33 as water may be taken out of that well. In this diagrammatic form, the water enters through a passageway 41 flows around the needle 40, and out through the port 42 into which the point of the needle 40 is entered and withdrawn depending upon the size opening desired through the port 42.

The tube 35 opens by its upper end into a valve chamber 43. This chamber is a cylindrical bore horizontally disposed through the upper body of the top closure 44 across the bowl 13. From the chamber 43, there leads a nozzle 45 to open into the primary venturi 29 as indicated in Fig. 4. In the form herein shown, this nozzle 45 discharges into the venturi 29 at the same elevation as that of the gasoline nozzle orifice 28.

Slidably positioned within the chamber 43 is a valve rod 46 which carries on its inner end a needle valve 68 to be entered into and withdrawn from the passageway 47 into which the nozzle 45 is entered and secured so that the valve 68 may serve as a closure to that passageway 47, or a throttling member, or a means to completely open that passageway 47 to flow therethrough.

The valve rod 46 extends through the member 44 to have in the present instance a packing 49 therearound, in an enlarged portion 50 of the bore 43. However the packing 49 may be dispensed with in most cases since there is not a sufficient leakage of air along the valve rod 46 or moisture therefrom to cause any serious consequence. In any event there is a compression spring 51 surrounding the valve rod 46 in this bore 50 to bear against some abutment, herein shown as the washer 52 against the packing 49, by one end of the spring, and by the other end of the spring against a cam plate 52a which is fixed on the rod 46 so that the rod 46 is normally urged outwardly to have the needle valve 68 in an open position as indicated in Fig. 4.

The rod 46 continues beyond the plate 52a to carry an outer end head 53 located within a diaphragm chamber 54, across which, is positioned a flexible diaphragm 55, and also fixed across the head 53 so that the diaphragm will be pushed outwardly to the position as indicated in Fig. 4 when the spring 51 is allowed to exert its strength normally.

Figure 1:
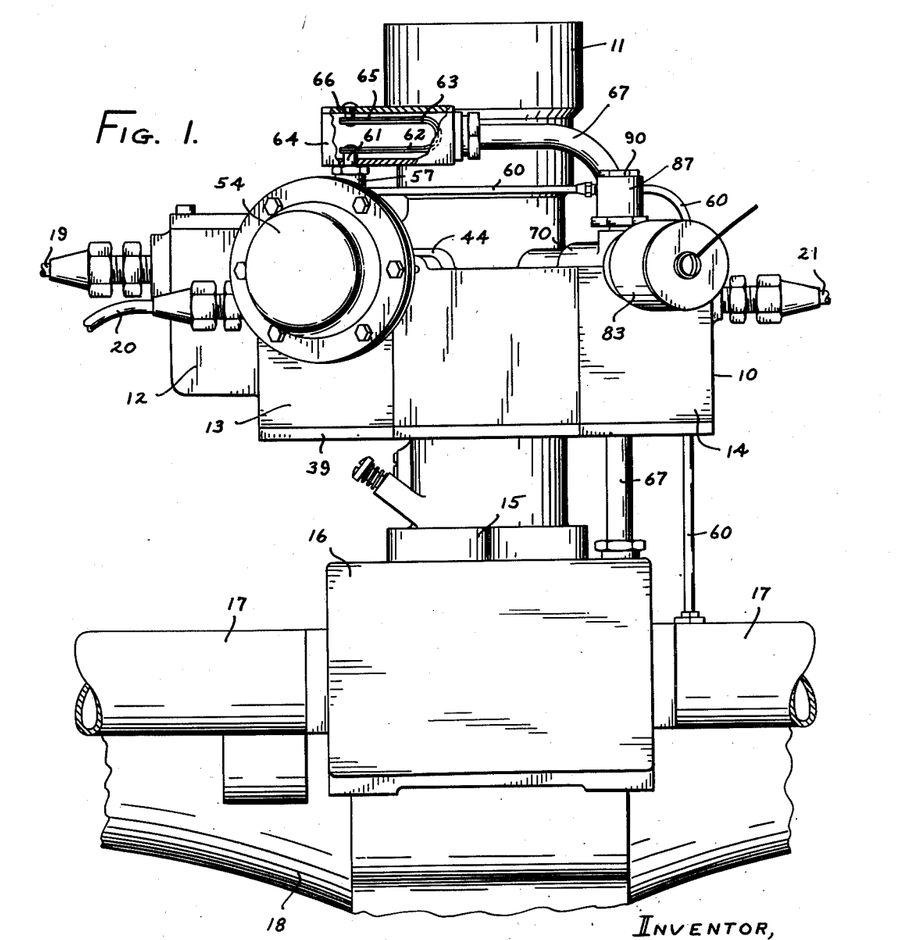
Fig. 1 is a view in side elevation of a carburetor structure embodying my invention and mounted on the intake manifold of an engine.

A plug 57 is screw-threadedly entered into the portion 44, herein shown as on the upper side thereof, to provide a passageway 58 from the inside of the plug 57 to open into the chamber 50. The passageway 58 opens into a vacuum chamber 59 to which is connected a pipe or tube 60 which runs therefrom around and downwardly to connect with the intake manifold 17, Figs. 1 and 2.

A push pin 61 is carried to traverse the chamber 59 in a vertical direction and have its lower end 61a normally above the path of the cam plate 52a. This pin 61 is connected by its upper end to the lower arm 62 of a U-shaped, bi-metallic thermostatic element 63, Fig. 1, this element 63 being carried in a housing 64. This element 63 has its upper arm 65 fixed by a stud 66 to the upper wall of the housing 64 so that expansion of the element 63, that is, tendency of the arms 62 and 65 to move apart will normally lower the pin 61 and lift it in the reverse travel of these arms. The element 63 is so constructed and mounted that when heat is applied to it these arms will tend to move one toward the other.

The chamber 64 is in communication through a tube 67 with the manifold heater 16. In other words the element 63 is thus subject to the heat of the exhaust as is made manifest in the exhaust heater 16.

The alcohol carrying bowl 14 has a ridge 70 across its top side directed radially of the air horn 11. Within this ridge 70 there is a bore 71 which slidingly guides a valve rod 72 longitudinally thereof. On the inner end of this rod 72 there is a needle valve 73 normally entered into the passageway 74 which is in communication between the bore 71 and the inside of the air horn 11. A nozzle 75 is fixed in the end of the passageway 74 next to the air horn 11, and is carried across radially of that horn, to have an inner end 76 open within the primary venturi 29, Fig. 5. The opening 76 is at the same elevation within the venturi 29 as is the orifice 28. The outer portion of the ridge 70 is provided with an enlarged bore 77 through which the valve rod 72 extends. Across the outermost end portion of the ridge 70 there is attached across the enlarged chamber 77 a solenoid winding 78 which carries an armature 79 centrally therewithin, this armature 79 being secured to the outermost end portion of the valve rod 72.

An abutment washer 80 is fixed around the valve rod 72 and a compression spring 81 is carried between that abutting washer 80 and an abutment 82 which extends across the shell 83 which carries the solenoid winding 78. The spring 81 thus normally urges the valve rod 72 inwardly to have the needle valve 73 seated to seal off the passageway 74, that position not being indicated in Fig. 5.

A vacuum or manifold pressure device is employed to retain that needle valve 73 in its closed position until it is desired that the passageway 74 be opened. In the present form of the invention as illustrated herein, there is provided an annular V-groove 84 around the valve stem 72, into which groove 84 a plunger 85 is normally seated by reason of a spring 86 urging it theretoward. This plunger 85 is slidingly carried in a plug 87 which is screw-threadedly entered into the ridge 70 to have the plunger 85 disposed in a manner which will permit it to seat in the groove 84. The upper end of the plunger 85 enters a chamber 88 in the plug 87 and has a head 89 fixed thereon in the nature of a piston, against which head 89 the spring 86 bears by its lower end. A plug 90 in the upper end closes off the chamber 88 and forms an upper abutment for the spring 86. A tube 91 enters the side of the plug 87 opening into the chamber 88. This tube 91 interconnects with the tube 60 through a T 92. Thus the chamber 88 is subject to the same pressures which may exist in the manifold 17.

A diffusing tube 93 has its upper end opening into the chamber 71, and its lower end depending within a well 94 at one side of the bowl 14, Fig. 5. Diagrammatically, a needle valve 95 is shown as controlling a flow from inside of the bowl 14 through the passageway 96 and around the valve through the passageway 97 into the lower portion of the well 94. The valve 95 is adjustable as indicated in order to control the rate of flow of the alcohol from the bowl 14 into the well 94 as the alcohol may be withdrawn from the well. The tube 93 has at its lower end a number of openings 98 therethrough. Surrounding the tube 93 in spaced relation is a sleeve 99 which extends from the upper end of the well to the bottom thereof, and the alcohol in the well 94 enters this sleeve only through its lower end portion through the series of holes 100 provided therein. At the upper end of the well 94 there is a transverse passageway 101 which leads from that well 94 to open into the air horn 11.

The solenoid winding 78 is energized only in response to certain high pressure, such as detonating pressuers within the engine. The energization of this winding 78 may be accomplished in a number of different ways, one particular way being shown herein, particularly in Fig. 3 wherein there is a tube 103 entering the shell 104 of a spark plug 105, and leading from the interior of the shell 104 to a contact making device generally indicated by the numeral 106.

Figures 2, 3:
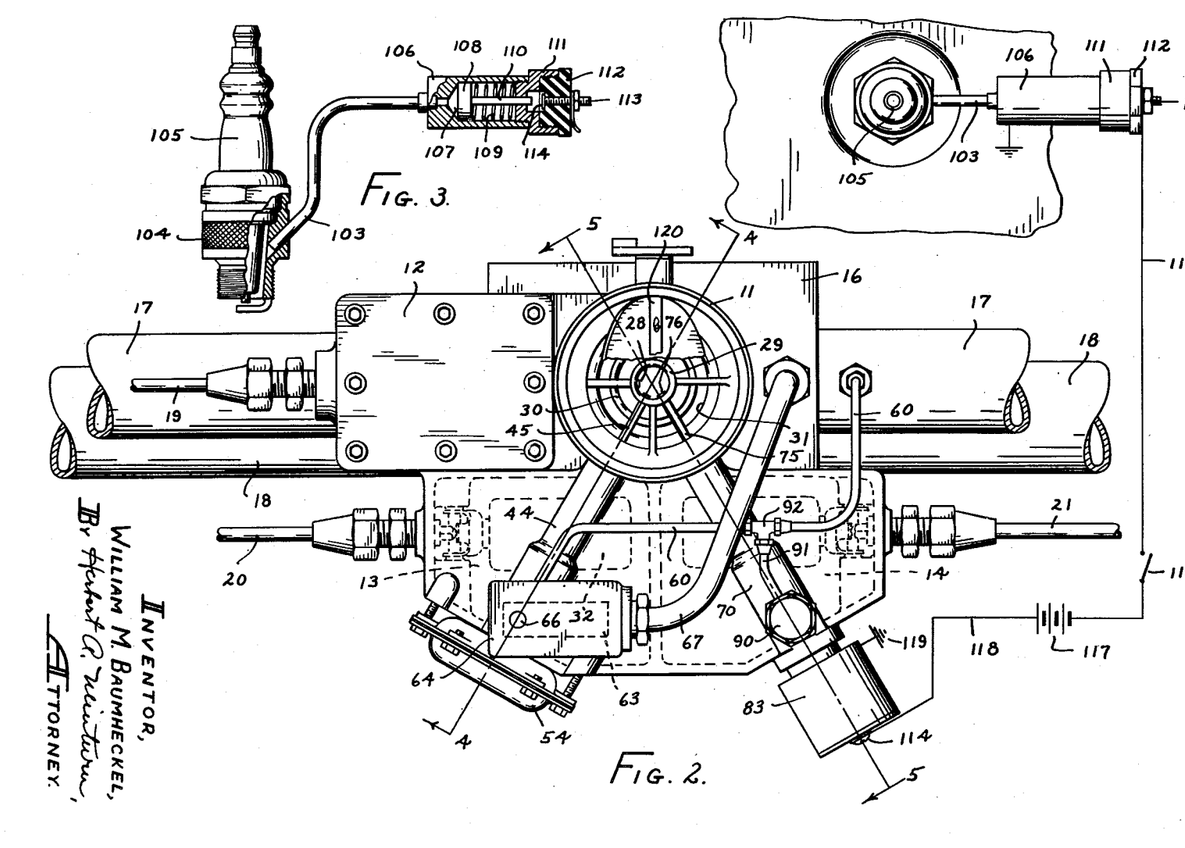
Fig. 2 is a view in top plan of the structure.
Fig. 3 is a view on an enlarged scale in elevation and partial section of a pressure responsive control device.

This device 106 consists essentially of a cylinder into which the tube 103 discharges. This cylinder is designated by the numeral 107, and carries a plunger 108 slidingly therein normally urged toward the tube end by means of a spring 109 surrounding a rod 110 which is fixed to the piston 108. Fixed to the opposite end of the cylinder 107 is a contact mechanism consisting in the present form of a plug 111 screwed into the cylinder and slidingly receiving therethrough the outer end portion of the rod 110. Entered into the outer end of the plug 111 is an insulating body 112 which carries an electrode 113 having an inner terminal 114 in the path of the end of the rod 110. The spring 109 bears compressibly by its outer ends against the piston 108 and the inner end of the plug 111. Thus when pressure is communicated to the inside of the cylinder 107 through the tube 103, and that pressure is sufficient to overcome the resistance of the spring 109, the piston 108 will move to carry the rod 110 into contact with the electrode 113. The shell of the spark plug 104 is grounded.

A conductor wire 115 leads from the external end of the electrode 113 through a control switch 116 across the usual battery of the automobile or airplane 117, from which the circuit continues through the wire 118 to an outer terminal 114 of the winding 78. The other end of the winding 78 is grounded as indicated at 119.

Operation of unit carburetor

As is the usual practice in down draft carburetors, the venturis 29, 30, and 31 are located intermediate the upper choke butterfly valve 120 and a lower throttle valve 200. In other words the water and alcohol as well as the gasoline discharges into the air horn are always above the control throttle valve.

Upon starting the engine, the gasoline feed is accomplished in the usual and well known manner, with the main power jet discharging through the orifice 28 into the primary venturi 29. Since the engine generally starts from a cold or relatively cool condition, no water or alcohol are desired to be supplied to the fuel and air mixture stream passing downwardly through the air horn 11.

In the normal operation of a carburetor, when the engine is cranked with the throttle nearly closed, there is generally supplied a slow speed or idle gasoline feed directly at the edge of the throttle valve, in order to supply the fuel mixture for such engine operating conditions. This particular feeding device is not herein shown, since it does not form a part of the invention per se. The fuel is not fed from the main gasoline port 28 at the idle or extremely low speed of the engine. At this idling speed, there is the greatest degree of vacuum or low pressure in the intake manifold. There is the least amount of air passing through the venturis of the carburetor. In other words there is not sufficient velocity of air to induce a flow from the various nozzles or jets discharging into the primary venturi 29.

As the throttle opening increases, the velocity of the air past the openings of the jets or tubes and the gasoline orifice 28 in the venturi 29 increases so that the fluids are accordingly fed therethrough into the venturi. As the speeds of the engine increase, the pressure in the intake manifold increases.

Thus when the engine is idling, and the pressure in the intake manifold is at its lowest, that pressure condition in the manifold is reflected through the tube 60 so that the low pressure condition is reflected in the part of the bore 50 so as to cause the valve rod 46 to tend to shift to the right and close off the passageway 47. That would be the operation when the thermostatic element 63 has become sufficiently heated to lift the pin 61, and the throttle valve 200 closed. In this regard, it is to be remembered that at the low speed condition (closed throttle) there is no need and no tendency for water to be pulled through the tube 45 into the venturi 29 due to the low velocity of air going through that venturi. Thus at idling speeds, even when the engine is heated, the needle valve 68 is closed and no water is being fed through the tube 45 into the primary venturi 29.

However when the speed of the engine increases, the pressure in the intake manifold 17 also increases to allow the spring 51 to tend to carry the valve rod 46 to the left, Fig. 4, and thus starting opening of the passageway 47 whereupon the water is fed into the venturi 29 by reason of the increasing rush of air passed the end of the tube within that venturi.

That water feed, however, is delayed if the engine be below a predetermined temperature, due to the thermostatic element 63 holding the pin 61 down in the path of the plate 52a to oppose action of the spring 51. When the predetermined higher temperature is reached the pin 61 lifts to allow the spring 51 to shift the rod 46, providing the intake manifold pressure is high enough.

When the engine speed drops, without a change in position of the throttle valve 200, the rush of air through the venturi 29 is somewhat less, and accordingly there will be a slightly less amount of water carried into the venturi into the fuel stream. However if the valve 200 is turned toward its closed position, to idle the engine, then the pressure in the intake manifold 17 decreases again, to cause the spring 51 to be overcome with the atmospheric pressure pushing the diaphragm 55 to the right, thus causing the needle valve 68 to approach its closed position to cut off or reduce the flow of water and air mixture through the tube 45 into the venturi 29. It is to be noted however that when the engine is running under heavy load, there is still a sufficient rush of air through the venturi 29 at sufficient velocity to cause the water to feed through the tube 45 to exert its beneficient action, this action being permissible on account of the relatively high pressure in the intake manifold 17 when the throttle valve 200 is open.

After the engine has been operated and is warm and then stopped, the rod 46 will be in the position shown in Fig 4. As the engine cools, the thermostat element 63 cools and forces the pin 61 downwardly to bear by its lower end (herein shown as having a forty-five degree conical end) against the cam plate 52a with the result that the rod 46 is cammed to the needle 68 closed position, and that position is maintained until the engine again is heated. Thus no water is fed upon starting a cold engine.

In regard to the alcohol feed, this feed is likewise controlled not only by the velocity of air through the venturi 29, but also in accordance with the pressure within the engine cylinder, such pressures approaching the pre-ignition or detonating pressures, and also the pressure in the intake manifold 17. The variation in the pressure of the gases in the intake manifold 17 is employed in this connection with alcohol feed as a hold feed factor setting up a possible alcohol feed condition dependent upon the pressure in the engine cylinder itself.

Referring to Fig. 5, when the engine is operating at idle and low load speeds, the pressure in the intake manifold is at its lowest, so that the pressure communicated from the intake manifold 17 under that condition is reflected through the tube 91 to have a corresponding pressure within the chamber 88 wherein the piston 89 is tended to be lifted and thus remove the rod 85 from engagement with the groove 84 in the rod 72 to allow the rod 72 to be shifted by the spring 81 to close off the passage 74.

The spring 81 normally seats the needle valve

73. Thus there is no alcohol feed until that needle valve 73 is shifted to the left to open the passageway 74.

When the predetermined extremely high pressures are reached in the engine cylinders or cylinder, those pressures are reflected through the tube 103 to cause contact to be made in the device 106 in order to close the circuit above described, and thus energize the solenoid 78. The instant that solenoid 78 is energized, the rod 72 is pulled to the left (plunger 85 being lifted upwardly in the normal low pressure conditions) whereupon the needle 73 is then pulled from the passageway 74 to permit the feeding of the alcohol-air mixture in the venturi 29. However it is further to be noted, that immediately these high pressures are encountered in the cylinder, the engine is then generally operating at a higher degree of pressure in the intake manifold which allows the plunger 85 be lowered by the spring 86 to ride against the side of the valve rod 72. The groove 84 is so spaced along the rod 82, that the pointed end of plunger 85 would drop in that groove and hold the rod 82 in the position where the needle valve 73 remains in an open position in relation to the passageway 74 against the push of the spring 81, after the solenoid has been deenergized.

In other words after the solenoid has initially operated, the alcohol immediately is squirted into the venturi 29, with the result that the pressure is lowered in the cylinder, and the circuit closing device 106 no longer has to operate and keep the solenoid 83 energized even though the conditions within the cylinder still require the feeding of alcohol. Thus the alcohol is continued to be fed until the intake manifold pressure decreases to the predetermined amount as will permit the rod 85 to be lifted in opposition to the spring 86. The calibration of the spring 86 is predetermined for that desired rate of feeding of alcohol in accordance with the operating pressures. Then, with the plunger 85 lifted under the low pressure condition in the manifold 17, the spring 81 may return the needle valve 73 to its closed position so that no alcohol is being fed under the low pressure conditions in the intake manifold. Obviously the various springs 51, in respect to the water feed, and the springs 81 and 86 in the alcohol feed, may be calibrated whereby the desired ratio of water to alcohol may be fed into the fuel stream going through the carburetor all in accordance with the demand of the engine.

*Carburetor adapter structure*

Figure 7:
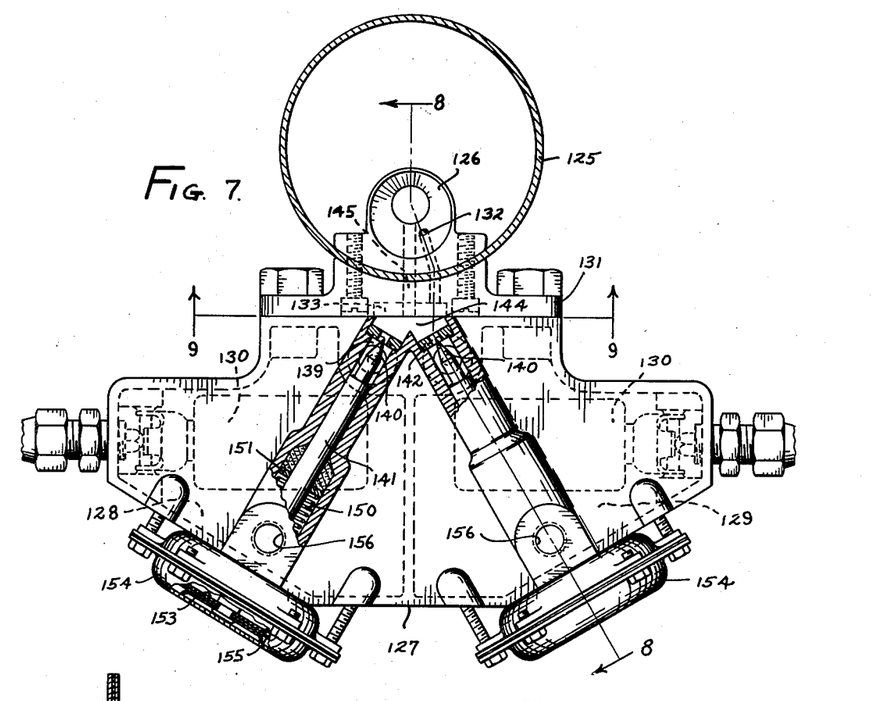
Fig. 7 is a view in top plan and partial section of a structure embodying the invention in that form which is to be applied to a normally installed carburetor.
Figure 8:
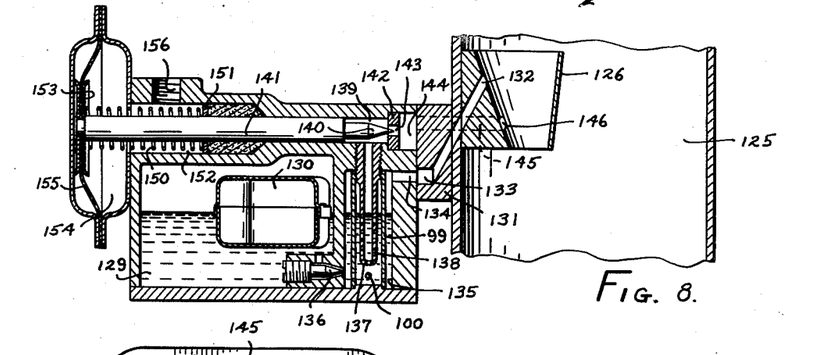
Fig. 8 is a view in vertical section on the line 8—8 in Fig. 7.
Figure 9:
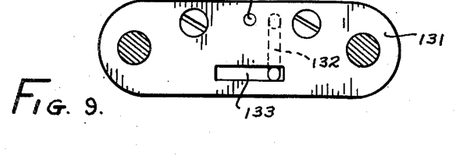
Fig. 9 is a view in vertical section on the line 9—9 in Fig. 7.

Referring to Figs. 7-9 inclusive, there is illustrated a structure which may be applied to carburetors already installed on engines without having to supply an entirely new carburetor of the structure above described. To this end, a sleeve 125 of any suitable length, preferably as short as possible, is provided to be attached to the top end of the carburetor air horn. Inside of this sleeve 125, along one side thereof there is provided a funnel-like member 126 having a wide opening at its top, and a smaller diameter opening at its lower end.

Then on the outside of the sleeve 125, there is mounted the double chamber member generally indicated by the numeral 127, to contain a water supply bowl 128 and an alcohol supply bowl 129. These chambers are automatically supplied with the respective liquids to maintain those liquids in the chambers at a predetermined level in the manner above described by the use of the customarily employed floats 130.

This member 127 in the form herein shown, is attached to a bracket 131 which is mounted externally of the sleeve 125. There is a tubular passageway 132 leading from the inside of the upper portion of the member 126, Fig. 8, downwardly into a transverse passageway 133, from which leads a passageway 134 in each instance to the respective bowls 128, 129, as best illustrated in Fig. 8. These passageways 134 open into wells 135 into which the particular fuel, water or alcohol as the case may be is metered past the needle valve 136 between the bowl and the well. In each instance, there is a tubular member 137 depending into the well 135 having openings 138 therein, and a top opening into a needle valve chamber 139.

The needle valve 140 is reciprocably carried within the chamber 139 on the end of a valve rod 141. A valve seat 142 is provided with a central orifice 143 to be disposed across the inner end of the valve chamber 139, and this opening 143 is exposed within a chamber 144 which is common to both valve seats 142, Fig. 7.

This common chamber 144 has a passageway 145 leading therefrom, through the bracket 131, and through the lower portion of the member 126 to open therein by an orifice 146, Fig. 8.

The needle valve 140 is normally closed against its seat 142 only in response to certain predetermined pressures within the intake manifold 17. Otherwise these needle valves 140 are seated in closed conditions on the seat members 142 by a manifold 17 pressure condition.

The needle valve 140 in each instance is normally urged to an unseated condition in reference to its seat 142 by means of a compression spring 150 bearing between an abutment 151 inside of an enlarged portion 152 of the chamber 139, and a head 153 secured on an outer end portion of the rod 141. The outer end portion of the rod 141 enters a diaphragm traversed chamber 154 so that the spring 150 in urging the valve 140 to its open position as indicated in Fig. 8, will carry the diaphragm 155 into an outer position as shown in Fig. 8. An opening 156 is provided in the enlarged portion 152 of the chamber 139, and this opening 156 normally receives a vacuum line such as the line 60 connecting with the intake manifold. This applies in each instance in respect to the structure thus described which is identical in all mechanical respects for both the water and the alcohol bowl. The only difference resides in the difference in resistance or load rating of the springs 150. For the water control, the spring 150 is made to have greater resistance to the return of the rod 141 to the right than is the spring 150 employed in the control of the rod 141 as applied to the alcohol bowl.

The spring 150 in the alcohol control is designed to prevent the alcohol needle valve 140 from opening until the manifold 17 pressure increases as a reflection of a heavier load on the engine in comparison to the load reflected by a higher degree of vacuum or lower pressure in the manifold.

That is to say, the water and alcohol feeding is separately controlled by a differential in intake manifold pressures, whereby the water feeds only after the manifold pressure increases from the idling engine condition to a part load operation, while the alcohol feeds only after a higher pressure occurs in the manifold reflecting a heavier load operation. The rates of feeds may be varied by the valves 136 to give the individual flows as well as the ratio of flow of alcohol to water desired. At these part and heavier loads, the pressures in the manifold 17 are still below atmospheric, so that the diaphragms 155 may operate responsively in opposition to the springs 150.

As to the alcohol usable, such alcohols as methanol, ethanol, and isopropanol are suitable. However, methanol, at present at least, is lower in cost and more readily available, and from the anti-detonant effect, is most satisfactory.

Thus it is to be seen that by reason of the use of my invention, the water and the alcohol are maintained in separate supplies and not previously intermixed until they may enter into the air stream in through the carburetor itself. By so doing, the alcohol usage is reduced to the bare minimum requirement. Of course the ratio of the alcohol used in proportion to the water can be determined by the diameters of the passageways leading from the control needles so that the ratio of alcohol to water may be set at a 50–50 ratio or any other ratio which may be desirable, at the time of the use of the alcohol itself.

Therefore, while I have herein shown and described my invention in the best form now known to me, it is obvious that structural changes may be employed without departing from the spirit of the invention, and I therefore do not desire to be limited to that precise form beyond the limitations which may be imposed by the following claims.

I claim:

1. The combination with an intake manifold and a gas engine carburetor of normal liquid fuel feeding means; water feeding means; alcohol feeding means; all of said means discharging into said carburetor; a water feeding control valve; an intake manifold pressure responsive member normally holding said water control valve closed; means interconnecting said member and said manifold; yielding means urging said water valve to an open condition, said yielding means shifting the valve to an open condition upon a manifold pressure predetermined increase above the pressure at engine idling speeds; an alcohol feeding control valve; an intake manifold pressure responsive device normally holding said alcohol valve closed; means interconnecting said alcohol valve manifold responsive device with said manifold; and yielding means opposing closing of and holding said alcohol valve; whereby the said fuel, water, and alcohol may be fed through said carburetor responsive to engine requirements therefor.

2. The combination with an intake manifold and a gas engine carburetor of normal liquid fuel feeding means; water feeding means; alcohol feeding means; all of said means discharging into said carburetor; a water feeding control valve; an intake manifold pressure responsive member normally holding said water control valve closed; means interconnecting said member and said manifold; a spring urging said water valve to an open condition, said spring shifting the valve to an open condition upon a manifold pressure predetermined increase above the pressure at engine idling speeds; an alcohol feeding control valve; an intake manifold pressure responsive device normally holding said alcohol valve closed; means interconnecting said alcohol valve manifold pressure responsive device with said manifold; and a spring urging said alcohol valve to an open condition upon a predetermined increase of manifold pressure above said engine idling speed pressure; whereby the said fuel, water, and alcohol may be fed through said carburetor responsive to engine requirements therefor; and thermostatic means subject to heat from said engine, normally maintaining said water feeding means inoperative until a predetermined engine temperature has been reached.

3. The combination with an intake manifold and a gas engine carburetor of normal liquid fuel feeding means; water feeding means; alcohol feeding means; all of said means discharging into said carburetor; a water feeding control valve; an intake manifold pressure responsive member normally holding said water control valve closed; means interconnecting said member and said manifold; a spring urging said water valve to an open condition, said spring shifting the valve to an open condition upon a manifold pressure predetermined increase above the pressure at engine idling speeds; an alcohol feeding control valve; an intake manifold pressure responsive device normally holding said alcohol valve closed; means interconnecting said alcohol valve manifold pressure responsive device with said manifold; and a spring urging said alcohol valve to an open condition upon a predetermined increase of manifold pressure above said engine idling speed pressure; whereby the said fuel, water, and alcohol may be fed through said carburetor responsive to engine requirements therefor; an engine cylinder pressure operated switch; electromagnetic means for shifting said alcohol feed control valve in opposition to said opposing spring therefor; and an electric circuit including said switch and said electro-magnetic means.

4. The combination with an intake manifold and a gas engine carburetor of normal liquid fuel feeding means; water feeding means; alcohol feeding means; all of said means discharging into said carburetor; a water feeding control valve; an intake manifold pressure responsive member normally holding said water control valve closed; means interconnecting said member and said manifold; a spring urging said water valve to an open condition, said spring shifting the valve to an open condition upon a manifold pressure predetermined increase above the pressure at engine idling speeds; an alcohol feeding control valve; an intake manifold pressure responsive device normally holding said alcohol valve closed; means interconnecting said alcohol valve manifold pressure responsive device with said manifold; and a spring urging said alcohol valve to an open condition upon a predetermined increase of manifold pressure above said engine idling speed pressure; whereby the said fuel, water, and alcohol may be fed through said carburetor responsive to engine requirements therefor; and an alcohol valve latching open device comprising a valve intercepting latch bar, a piston for lifting the latch bar subjected to manifold pressure, and spring means engaging the latch bar with said valve in an open position effected by said electric-magnetic means, and overcome by drop in said manifold pressure to restore control of the valve to its said spring and said holding device.

5. For supplying a liquid fuel, water, and alcohol separately through a carburetor to the intake manifold of a gas engine in accordance with individual demand; a bowl for each of said liquids; a jet leading from each of said bowls to discharge into the carburetor on the intake side of the control throttle valve of the carburetor; a separate valve each controlling the water and the alcohol flows in said jets; a vacuum chamber connected with said manifold; means in said chamber for shifting said water control valve to a valve closed condition at the lowest manifold pressure; a spring for opening the valve at predetermined higher manifold pressures; means normally seating said alcohol flow control valve to a shut-off condition under said manifold lowest pressures; and means opening said alcohol flow control valve at pressures above said predetermined higher manifold pressures; whereby, independently of the fuel flow, water flow may be had in addition without alcohol flow, and alcohol flow may be had in addition to the water flow only on high power demand of the engine.

6. For supplying a liquid fuel, water, and alcohol separately through a carburetor to the intake manifold of a gas engine in accordance with the engine demand for each of the liquids, a bowl for each of said liquids; a separate jet discharging from each of said bowls into said carburetor on the intake side of its throttle valve; a valve intercepting said water jet; a vacuum chamber; a diaphragm across the chamber; a valve rod connected to said diaphragm to shift the valve by movement of the diaphragm; a spring normally unseating the valve; a conduit between said chamber and said intake manifold whereby low pressures in the manifold tend to seat the valve in opposition to said spring to close off flow of water in the water jet; a second valve mounted to intercept alcohol flow in its jet; a spring normally seating the alcohol flow control valve; an engine cylinder pressure responsive device; alcohol valve actuating means responsive to said device opening the alcohol valve at predetermined engine cylinder pressures in opposition to said alcohol valve seating spring.

7. For supplying a liquid fuel, water, and alcohol separately through a carburetor to the intake manifold of a gas engine in accordance with the engine demand for each of the liquids, a bowl for each of said liquids; a separate jet discharging from each of said bowls into said carburetor on the intake side of its throttle valve; a valve intercepting said water jet; a vacuum chamber; a diaphragm across the chamber; a valve rod connected to said diaphragm to shift the valve by movement of the diaphragm; a spring normally unseating the valve; a conduit between said chamber and said intake manifold whereby low pressures in the manifold tend to seat the valve in opposition to said spring to close off flow of water in the water jet; a second valve mounted to intercept alcohol flow in its jet; a spring normally seating the alcohol flow control valve; an engine cylinder pressure responsive device; alcohol valve actuating means responsive to said device opening the alcohol valve at predetermined engine cylinder pressures in opposition to said alcohol valve seating spring; spring operated means for latching said alcohol valve in an unseated condition; and manifold pressure operated means for releasing said latching means upon a predetermined drop in the manifold pressure to restore said alcohol valve to influence of its seating spring.

8. For supplying a liquid fuel, water, and alcohol separately through a carburetor to the intake manifold of a gas engine in accordance with the engine demand for each of the liquids, a bowl for each of said liquids; a separate jet discharging from each of said bowls into said carburetor on the intake side of its throttle valve; a valve intercepting said water jet; a vacuum chamber; a diaphragm across the chamber; a valve rod connected to said diaphragm to shift the valve by movement of the diaphragm; a spring normally unseating the valve; a conduit between said chamber and said intake manifold whereby low pressures in the manifold tend to seat the valve in opposition to said spring to close off flow of water in the water jet; a second valve mounted to intercept alcohol flow in its jet; a spring normally seating the alcohol flow control valve; an engine cylinder pressure responsive device; alcohol valve actuating means responsive to said device opening the alcohol valve at predetermined engine cylinder pressures in opposition to said alcohol valve seating spring; spring operated means for latching said alcohol valve in an unseated condition; and manifold pressure operated means for releasing said latching means upon a predetermined drop in the manifold pressure to restore said alcohol valve to influence of its seating spring; said cylinder pressure responsive device comprising a pressure operated switch; said alcohol valve actuating means comprising an electro-magnet; and a circuit including said switch and said magnet.

9. Apparatus for supplying water and alcohol separately through a fuel carburetor to an engine intake manifold, comprising a bowl for holding water; a bowl for holding alcohol; a separate jet discharging from each of said bowls into said carburetor, each discharge being on the air intake side of the control throttle valve of the carburetor to be subject primarily to air flow velocities therepast and removed from manifold pressure variations; a valve controlling flow through the water jet; a second valve controlling flow through the alcohol jet; a spring operating each valve to an open position; a manifold connected pressure chamber for each valve; means shifting each valve against resistance of its spring actuated by pressure in the respective chamber; and each of said springs being provided with tension different from the other, whereby a differential in manifold pressure will hold closed the water valve at predetermined low manifold pressure, allow it to open at a higher pressure, and hold closed the alcohol valve until the manifold pressure reaches a pressure still higher than that opening the water valve.

10. In a carburetor for a gas engine having a normal fuel feed means, a fuel modifying liquid supply structure comprising a jet discharging in the carburetor under air velocity effect; a liquid supply bowl; said jet having an interconnecting passageway leading to said bowl; a needle valve intercepting said passageway; a shiftable rod interconnected to said valve; a diaphragm chamber into which said rod extends; a diaphragm across the chamber, to which is fixed said rod; a passageway from the intake of said engine to said chamber; a spring normally tending to shift said rod to an open valve condition against a closing tendency of the vacuum effect on said diaphragm; a thermostat element heated in response to engine temperature; a pin actuated by the element to move toward said rod upon a temperature reduction; and a cam on said rod in the path of said pin upon said open valve condition; said pin driving said cam to shift said rod to a closed valve condition upon a predetermined temperature drop.

11. In a carburetor for a gas engine having a normal fuel supply delivered through an intake conduit, a fuel modifying liquid supply structure comprising a liquid supply; a jet discharging into the carburetor from said supply; a valve controlling liquid flow through said jet; means responsive to pressures developed by said engine for shifting said valve; and means for fixing said valve in a predetermined position responsive to a predetermined engine operating condition; spring means normally urging said valve to a jet shut-off position; a member actuated only upon pressures in said engine above predetermined operating pressures for shifting the valve to a jet flow position; and said valve positioning fixing means comprising a latch member to hold said valve in set jet flow position upon a predetermined conduit pressure higher than that at engine idling speeds, and pressure operating latch member releasing means responsive to conduit pressures below said last predetermined pressure to allow said valve to move to its said shut-off position under influence of said spring.

WILLIAM M. BAUMHECKEL.

REFERENCES CITED

The following references are of record in the file of this patent:

UNITED STATES PATENTS

| Number | Name | Date |
| --- | --- | --- |
| 2,142,979 | Hans | Jan. 3, 1939 |
| 2,444,179 | Anderson | June 29, 1948 |
| 2,518,657 | Boyce | Aug. 15, 1950 |